US011162494B2

(12) United States Patent
Alecu et al.

(10) Patent No.: US 11,162,494 B2
(45) Date of Patent: Nov. 2, 2021

(54) SCAVENGE PUMP (71) Applicant: PRATT & WHITNEY CANADA CORP., Longueuil (CA)

(72) Inventors: Daniel Alecu, Longueuil (CA); Sam Cutrara, Caledon East (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 234 days.

(21) Appl. No.: 16/254,800

(22) Filed: Jan. 23, 2019

(65) Prior Publication Data
US 2020/0232388 A1   Jul. 23, 2020

(51) Int. Cl.
*F04C 2/18* (2006.01)
*F04C 2/14* (2006.01)
*F04C 2/16* (2006.01)
*F04D 27/02* (2006.01)
*F02C 7/06* (2006.01)

(52) U.S. Cl.
CPC ............... *F04C 2/18* (2013.01); *F04C 2/14* (2013.01); *F04C 2/16* (2013.01); *F04D 27/0207* (2013.01); *F02C 7/06* (2013.01)

(58) Field of Classification Search
CPC .......... F04C 2/18; F04C 2/14; F04C 2220/20; F04C 23/00; F04C 23/001; F04C 15/0042; F04C 15/0006; F04C 15/0062; F04C 28/26; F04C 29/12; F04C 2/088; F04D 27/0207; F01D 25/20; F01D 25/18; F05D 2260/98; F05D 2260/608
See application file for complete search history.

(56) References Cited

U.S. PATENT DOCUMENTS

| | | | |
|---|---|---|---|
| 3,692,432 A | * | 9/1972 | Liang ...................... F04C 14/26 417/286 |
| 4,322,231 A | | 3/1982 | Hilzendeger et al. |
| 4,355,964 A | * | 10/1982 | Rodibaugh ......... F04C 15/0053 418/206.1 |
| 4,480,970 A | * | 11/1984 | Smith ................. F04C 15/0053 418/15 |
| 4,525,995 A | * | 7/1985 | Clark ...................... F01D 25/18 184/6.11 |
| 4,536,200 A | | 8/1985 | Reist |
| 4,631,009 A | * | 12/1986 | Cygnor ................. F04C 11/001 418/132 |
| 4,707,165 A | | 11/1987 | Tauber et al. |
| 4,715,244 A | | 12/1987 | Byrd et al. |

(Continued)

FOREIGN PATENT DOCUMENTS

| | | | | |
|---|---|---|---|---|
| GB | 1336344 A | * | 11/1973 | ............... F04C 2/18 |
| WO | 2015153906 | | 10/2015 | |

*Primary Examiner* — Woody A Lee, Jr.
*Assistant Examiner* — Brian Christopher Delrue
(74) *Attorney, Agent, or Firm* — Norton Rose Fulbright Canada LLP (57) ABSTRACT

The pump can have a pump body, a main cavity having an inlet and an outlet, a rotor rotatably mounted in the main cavity and configured to pump fluid from the inlet to the outlet as it rotates, a separator cavity disposed adjacent the main cavity and configured to sustain a vortex, a fluid passage fluidly connecting the main cavity to the separator cavity, the fluid passage preserving momentum of fluid from the main cavity to the separator cavity to contribute to the vortex.

20 Claims, 7 Drawing Sheets

(56) References Cited

U.S. PATENT DOCUMENTS

| | | | |
|---|---|---|---|
| 5,004,407 A * | 4/1991 | Hutchison | F01D 25/20 |
| | | | 184/6.23 |
| 5,085,561 A | 2/1992 | Yano et al. | |
| 5,531,129 A | 7/1996 | Thornton et al. | |
| 6,149,703 A | 11/2000 | Parker | |
| 6,398,833 B1 | 6/2002 | Santerre et al. | |
| 6,533,845 B2 | 3/2003 | Tokar et al. | |
| 6,991,665 B1 | 1/2006 | Allen et al. | |
| 7,124,662 B2 * | 10/2006 | Santerre | F16H 3/001 |
| | | | 74/665 H |
| 7,396,376 B2 | 7/2008 | Schrage et al. | |
| 7,532,969 B2 * | 5/2009 | Bruno | F01D 17/06 |
| | | | 324/178 |
| 8,114,196 B2 | 2/2012 | Lamee | |
| 8,201,664 B2 | 6/2012 | Brouillet et al. | |
| 8,357,219 B2 | 1/2013 | Boehrs et al. | |
| 8,529,668 B2 | 9/2013 | Short et al. | |
| 8,545,589 B2 | 10/2013 | Rocklitz et al. | |
| 8,601,785 B2 * | 12/2013 | Legare | F01D 25/20 |
| | | | 60/39.08 |
| 8,702,373 B1 * | 4/2014 | Valva | F01M 1/02 |
| | | | 415/111 |
| 8,734,572 B2 | 5/2014 | Zhang et al. | |
| 8,845,898 B2 | 9/2014 | Dede et al. | |
| 8,973,760 B2 | 3/2015 | Ries et al. | |
| 9,033,690 B2 * | 5/2015 | Alecu | F04C 15/0019 |
| | | | 418/206.1 |
| 9,260,980 B2 | 2/2016 | Leese | |
| 9,308,483 B2 | 4/2016 | Jackson et al. | |
| 9,446,333 B2 | 9/2016 | Vercammen | |
| 9,782,702 B2 | 10/2017 | Carrion | |
| 9,795,914 B2 | 10/2017 | Beier et al. | |
| 10,024,239 B2 | 7/2018 | Turcotte | |
| 10,201,772 B2 | 2/2019 | Allott et al. | |
| 10,247,102 B2 | 4/2019 | Dreher et al. | |
| 10,337,600 B2 | 7/2019 | Ture | |
| 10,512,865 B2 | 12/2019 | Eyers et al. | |
| 10,577,974 B2 * | 3/2020 | Valva | F02C 7/36 |
| 2003/0037757 A1 * | 2/2003 | Osband | F02B 75/22 |
| | | | 123/195 R |
| 2006/0102428 A1 * | 5/2006 | Anada | F04C 11/005 |
| | | | 184/6 |
| 2006/0257267 A1 * | 11/2006 | Weiss | F04C 2/082 |
| | | | 417/199.1 |
| 2007/0178003 A1 * | 8/2007 | Zhu | F04C 2/088 |
| | | | 418/206.1 |
| 2011/0277442 A1 | 11/2011 | Drobniak | |
| 2012/0240535 A1 | 9/2012 | Mann et al. | |
| 2013/0121854 A1 * | 5/2013 | Thiel | F04C 2/18 |
| | | | 417/313 |
| 2013/0323104 A1 * | 12/2013 | Alecu | F04C 15/0034 |
| | | | 418/1 |
| 2015/0337731 A1 * | 11/2015 | Stutz | F01C 21/108 |
| | | | 417/229 |
| 2015/0343346 A1 * | 12/2015 | Sheridan | B01D 35/26 |
| | | | 210/806 |
| 2016/0146048 A1 * | 5/2016 | Valva | F02C 7/32 |
| | | | 416/1 |
| 2017/0107872 A1 * | 4/2017 | McGowan | F04C 15/0026 |
| 2018/0119617 A1 | 5/2018 | Pulter et al. | |
| 2019/0162063 A1 * | 5/2019 | Brown | F04D 13/08 |
| 2019/0162182 A1 * | 5/2019 | McGowan | F04C 2/084 |
| 2019/0249537 A1 * | 8/2019 | Brown | E21B 43/38 |
| 2019/0345853 A1 | 11/2019 | Stachowiak | |
| 2019/0383168 A1 * | 12/2019 | Valva | F01D 25/20 |
| 2020/0141223 A1 * | 5/2020 | Brown | E21B 43/121 |
| 2021/0054840 A1 * | 2/2021 | Nair | F04C 11/001 |

\* cited by examiner

SCAVENGE PUMP

TECHNICAL FIELD

The application related generally to gas turbine engines and, more particularly, to scavenge pumps therefore.

BACKGROUND OF THE ART

Typical gas turbine engines have an oil system which can serve a variety of purposes. One of these purposes is to provide oil to lubricate the bearings which are used between the rotating and non-rotating components of the engine, or between high-pressure and low-pressure rotors, for instance. Seals are used to trap the oil, and mixed oil and air coming from the seals, typically in the form of an oil foam, is scavenged, filtered and re-used. It was known to use an oil tank between a main pump which fed the oil into a network of pipes and nozzles, and one or more scavenge pumps. For the oil tank to allow the oil foam to settle into liquid, it may need to be relatively big, heavy and bulky which is undesirable. It is thus desired to actively separate the air from the oil, at least to a certain extent, between the scavenging of the air/oil mixture and the delivery of oil.

SUMMARY

In one aspect, there is provided a pump comprising a pump body, a main cavity having an inlet and an outlet, a rotor rotatably mounted in the main cavity and configured to pump fluid from the inlet to the outlet as it rotates, a separator cavity disposed adjacent the main cavity and configured to sustain a vortex, a fluid passage fluidly connecting the main cavity to the separator cavity, the fluid passage preserving momentum of fluid from the main cavity to the separator cavity to contribute to the vortex.

In another aspect, there is provided a gas turbine engine comprising a compressor, a combustor, and a turbine in fluid flow communication, bearings via which rotating components are rotatably held in non-rotating components, an oil lubrication system for delivering oil to the bearings, and an oil scavenge system for collecting oil from the bearings, the oil scavenge system having at least one scavenge pump having a pump body, a main cavity having an inlet and an outlet, a rotor rotatably mounted in the main cavity and configured to pump fluid from the inlet to the outlet as it rotates, a separator cavity disposed adjacent the main cavity, a fluid passage fluidly connecting the main cavity to the separator cavity, the fluid passage preserving momentum of fluid from the main cavity to the separator cavity to contribute to a vortex in the separator cavity.

In a further aspect, there is provided a method of scavenging oil in a gas turbine engine, the method comprising: rotating a rotor in a main cavity having an inlet and an outlet, the rotor pumping an air/oil mixture from the inlet to the outlet; bleeding a radially outer portion of the rotating flow from a location between the inlet and the outlet, to a separator cavity, and guiding a momentum of the bled flow to drive a vortex in the separator cavity, drawing separated oil from a first end of the separator cavity and drawing separated air from a second end of the separator cavity.

DESCRIPTION OF THE DRAWINGS

Reference is now made to the accompanying figures in which.

DETAILED DESCRIPTION

Figure 1:
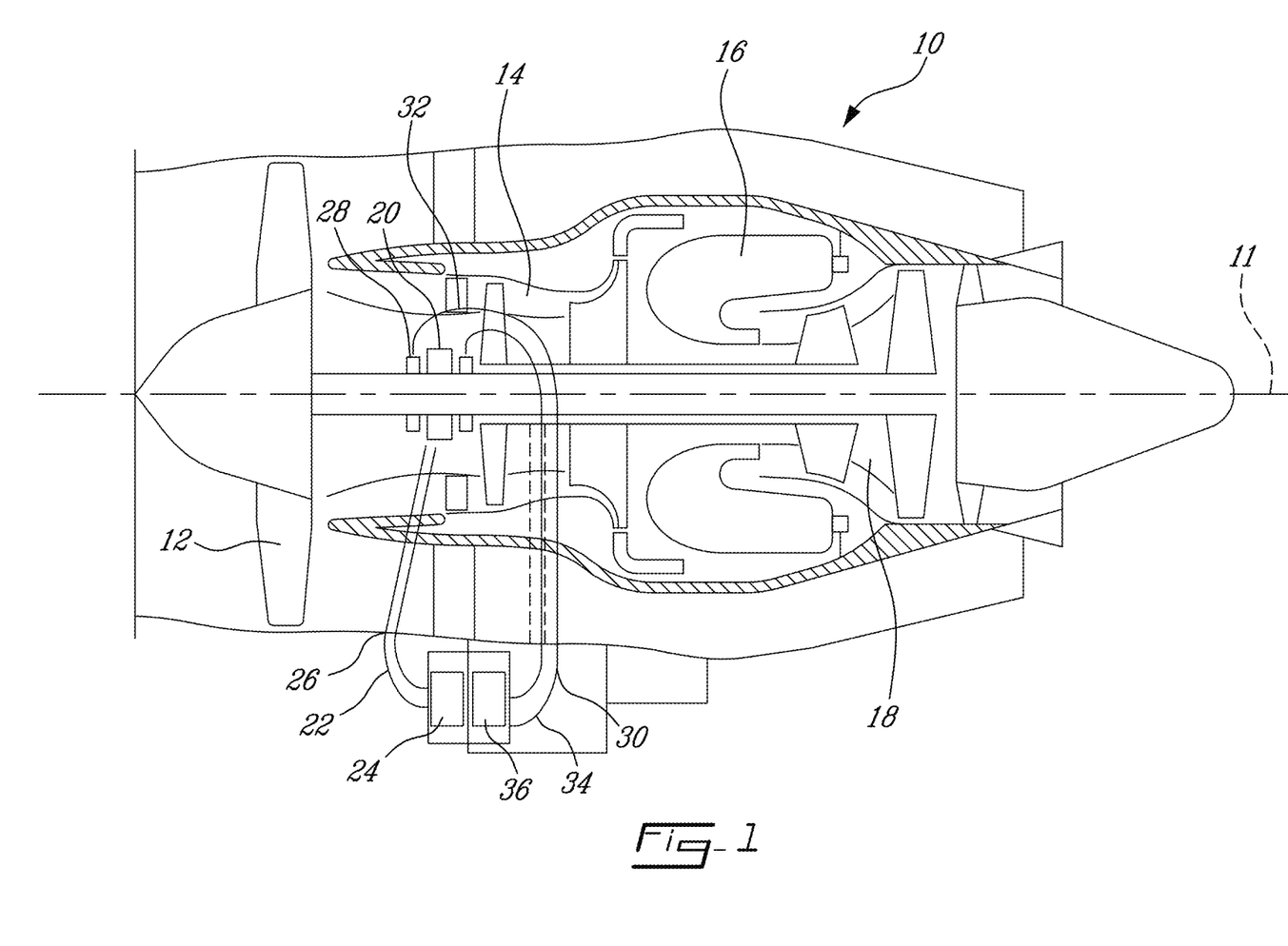
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to contain the oil. A scavenge system 30 having cavities 32, conduits 34, and one or more scavenge pumps 36, is used to recover the oil, which can be in the form of an oil foam at that stage, from the bearings 20.

A pump configuration, together with some example embodiments, will now be described. The pump configuration can include a separator to fully or partially separate the air from the oil. The separator can operate on the principle of a vortex driven by the momentum of the fluid which stems from the operation of the pump. The vortex can be parallel to the cavity where the oil is pumped, and housed in the body of the pump itself. If the oil separation is full, the oil can directly be fed to the (main) oil pump, without passing through a reservoir. However, even if the oil separation is partial, there can be some advantages to separating the oil in this manner, such as reducing the size of the oil tank or achieving separation by consuming less energy, generating less heat, using components which have less weight, and/or using components which are less bulky, for instance.

Figure 2:
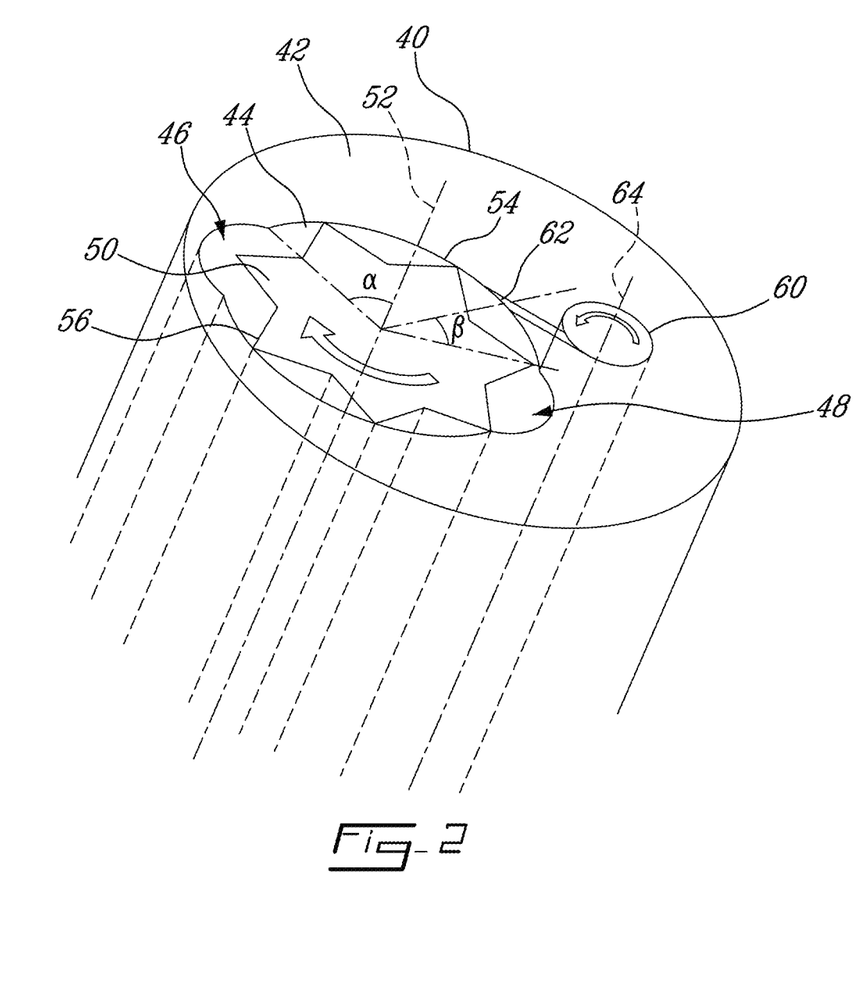
FIG. 2 is a simplified, conceptual sketch showing an example of a scavenge pump.

FIG. 2 schematizes an example of such a pump configuration. The pump 40 illustrated in FIG. 2 can be seen to generally include a pump body 42, a main cavity 44 being generally cylindrical in shape, having an inlet 46 and an outlet 48, and a rotor 50. The rotor 50 is rotatably mounted in the main cavity 44 and is configured in a manner to be driven in rotation around a rotor axis 52. The main cavity 44 has a curved surface 54 between the inlet 46 and the outlet 48, and the rotor 50 has a plurality of pushing members 56 which closely follow the curved surface 54 between the inlet 46 and the outlet 48 during rotation, effectively pushing the fluid therebetween. Generally, FIG. 2 schematizes a positive displacement pump of the rotary type, wherein fluid is displaced by the movement of pushing members. It will be understood that the concept that will now be explained can be applied to different types of rotary positive displacement pumps, such as a vane pump or a gear pump, for instance. In a gear pump, such as presented in another example below, there are two rotors which are meshed to one another by gears and which rotate around adjacent, parallel axes, but the operation of operation can otherwise be generally comparable.

A separator cavity 60 is also provided in the pump body 42, and disposed adjacent the main cavity 44. A fluid passage 62 fluidly connects the main cavity 44 to the separator cavity 60. The fluid passage 62 is configured to preserve momentum of the fluid as it exits the main cavity, in a manner that the tangential momentum of the fluid which is driven by the movement of the rotor 50 be significantly preserved, and used to drive a vortex in the separator cavity 60. The vortex occurs around an axis 64 of the separator cavity 60. In the embodiments illustrated, the momentum of the fluid is the main driving force of the vortex, and the separator cavity is empty except for the liquid/gas mixture, and free from any rotor. To this end, the fluid passage 62 can connect both the main cavity 44 and the separator cavity 60 tangentially, for instance. This tangential relationship does not need to be perfect, but orienting the passage off tangential either as it connects the main cavity 44, or as it connects the separator cavity 60, past a certain extent, can lead to less than optimal transfer of momentum, and thus a weaker vortex, in the separator cavity 60. For the same reasons, it can be preferable to use a straight fluid passage as opposed to a tortuous or curved one, a short fluid passage as opposed to a longer one, and to have a wide fluid passage rather than a very narrow one. There is, however, one competing effect which will tend to limit the width of the fluid passage 62: the more the fluid passage outlet is concentrated in the outer periphery of the separator cavity 60, the better the vortex may be. One can understand this latter principle by imagining a fluid passage which would be wider than the radius of the separator cavity 60, which would lead to two portions of the incoming flow working in opposite angular orientations; or imagining a fluid passage which would direct its flow towards the axis of the separator cavity, as opposed to its periphery, which could lead to no net rotation force in the separator cavity. To this end, it can be preferred for the width of the fluid passage to be of less than half of the radius of the separator cavity 60, for instance, and perhaps about one quarter of the radius of the separator cavity 60. For the same reasons, it can be preferred for the separator cavity 60 to have a cylindrical shape, or another solid-of-revolution shape, and a smooth inner surface, in an effort to facilitate and favour the vortex action.

Figure 3:
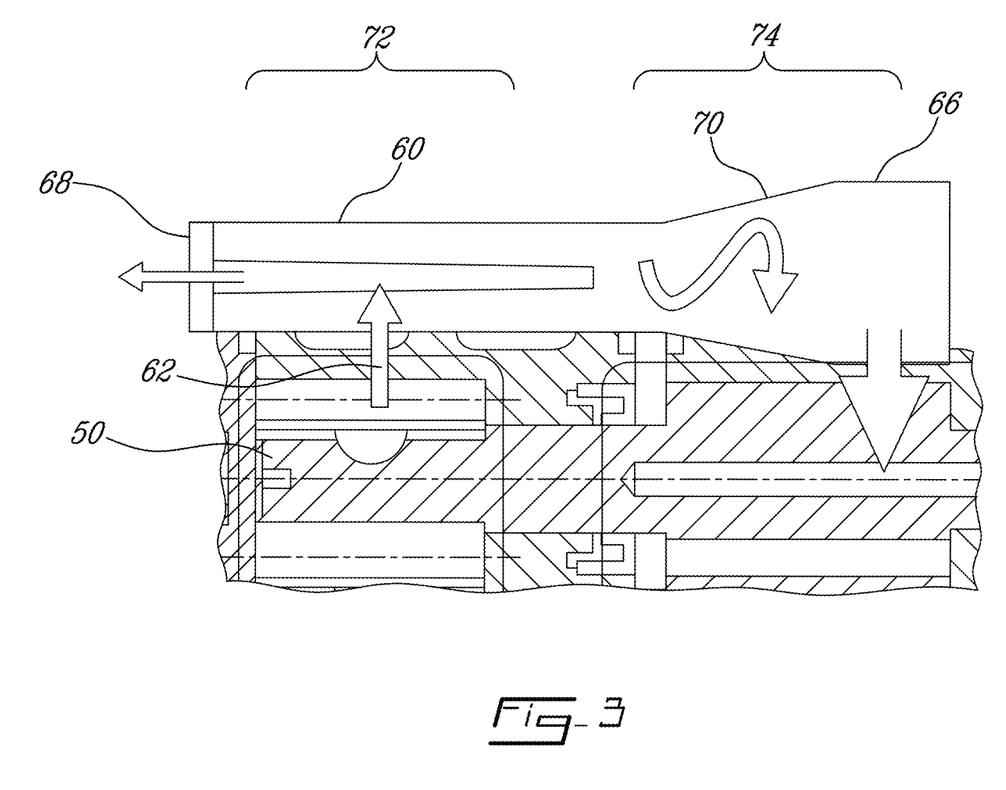
FIG. 3 is a cross-sectional view of the scavenge pump of FIG. 2, taken across a radially-extending plane.

As schematized in FIG. 3, a first axial end 66 of the separator cavity 60 can have an oil outlet, and a second, opposite, axial end 68 of the separator cavity 60 can have an air outlet. In the schematized view of FIG. 3, a portion 70 of the separator cavity radially broadens in the axial direction of the first axial end 66. The helical flow circulating in the conical portion will naturally reduce its velocity and therefore increase its static pressure, which can be desirable. It was found possible to control the air/oil separation in the separator cavity 60 to a certain extent by adjusting the size (e.g. diameter) of the aperture of the air outlet.

In the embodiment shown in FIG. 3, the separator cavity 60 can receive the oil from a first axially-delimited stage 72 acting as a scavenge pump 36, and a second axially-delimited stage 74, adjacent the first stage 72, can receive the separated oil and act as a main oil pump 24. Indeed, if the oil is considered to be sufficiently separated as it reaches the oil outlet, it can be directly fed to the main oil pump, whether this main oil pump is combined as a subsequent stage, or provided as a separate device. This configuration is only one possible, optional, example, and the oil outlet can be connected to an entirely distinct main pump, or to an oil tank, in alternate embodiments, to name two examples.

Turning back to FIG. 2, it was found that the location at which the fluid passage 62 branches off from the curved surface 54 of the main cavity 44 can be a factor in the efficiency of the design. Indeed, the operation of the pump rotor 56 itself imparts momentum to the fluid and this momentum, to a certain extent, drives a centrifugal separation of the oil from the air, the heavier oil migrating to the radially outer region of the cavity 44, against the curved surface 54, and the air migrating to the radially inner region of the cavity. To optimise the operation of the separator cavity 60, it can be desired to harness this "primary" separation effect. It was found at least in some embodiments that it took a given angular span for this primary separation effect to substantially take place. In the first few degrees past the inlet, the primary separation effect had hardly begun. In the tests performed, it was once the fluid had reached roughly 60 degrees from the inlet that the primary separation was considered to have taken place. This primary separation was found to continue to improve after the first 60 degrees, until it reached roughly 90 degrees, at which stage any further improvement in separation was considered to be negligible. Accordingly, it can be desired to position the inlet of the fluid passage 62 at a location which is at least 50 degrees past the inlet 46 of the main cavity 44, preferably at least 60 degrees, and perhaps even more preferably at least 70, 80 or even 90 degrees. The angle between the main cavity inlet and the fluid passage inlet can be identified as angle α.

However, one factor which limits the available distance between the main cavity inlet and the fluid passage inlet is related to the pitch of the pushing members 56 of the rotor. Indeed, the rotor has a plurality of pushing members 56 being circumferentially interspaced from one another by a pitch angle. The fluid is "trapped" between successive pushing members 56 only to the extent where the space between the pushing members is not aligned with the inlet 46 or the outlet 48 of the main cavity 44. Otherwise, there is pressure communication between the space between adjacent pushing members, and the respective one of the inlet 46 and the outlet 48 of the main cavity. To favor efficiency, it was found preferable to block communication of pressure between the fluid passage inlet and the main cavity outlet during operation, which can be achieved, as a person skilled in the art will understand, by maintaining an angle β between the fluid passage and the main cavity outlet which is greater than the spacing between successive pushing members (pitch angle).

Figure 4A:
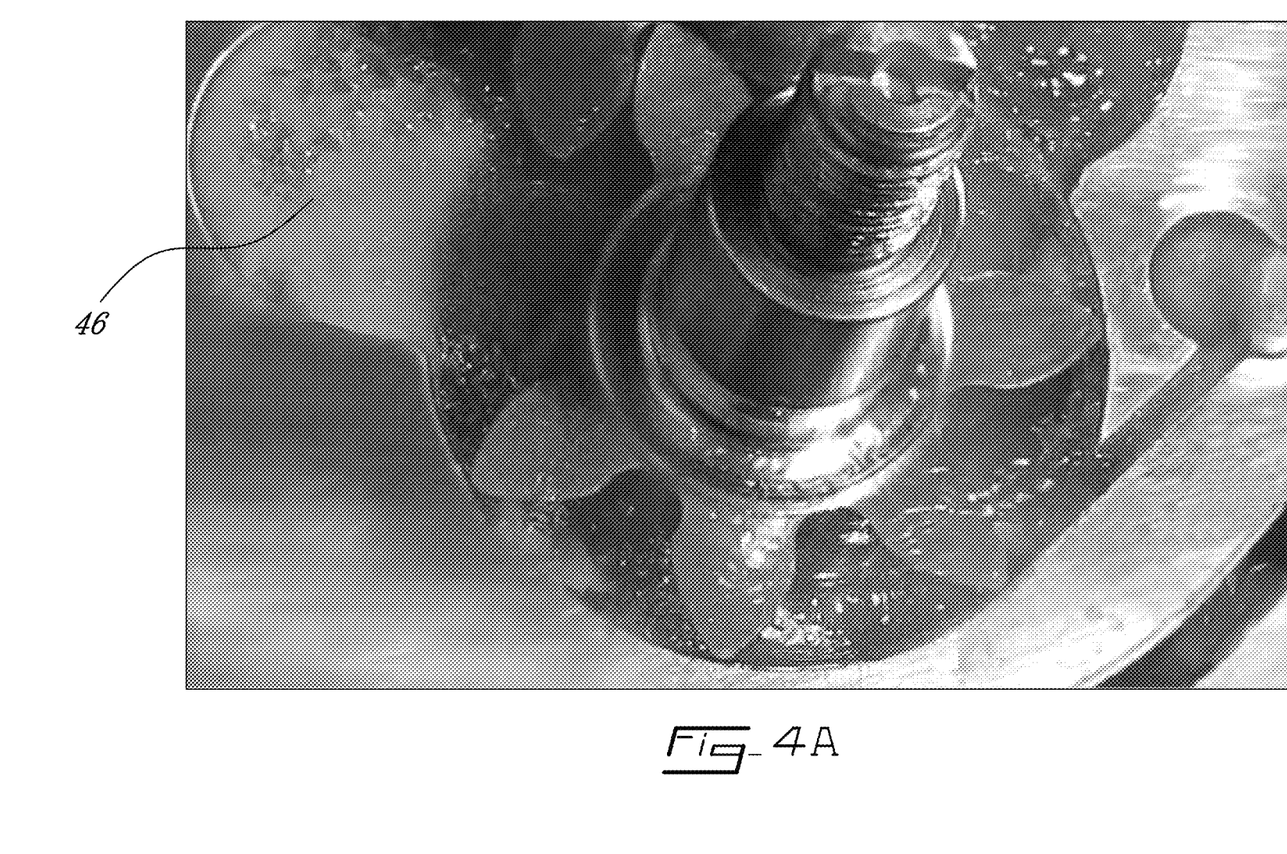
FIG. 4A and FIG. 4B show the fluid movement between two corresponding positions of a tooth relative to a fluid passage inlet.
Figure 4B:
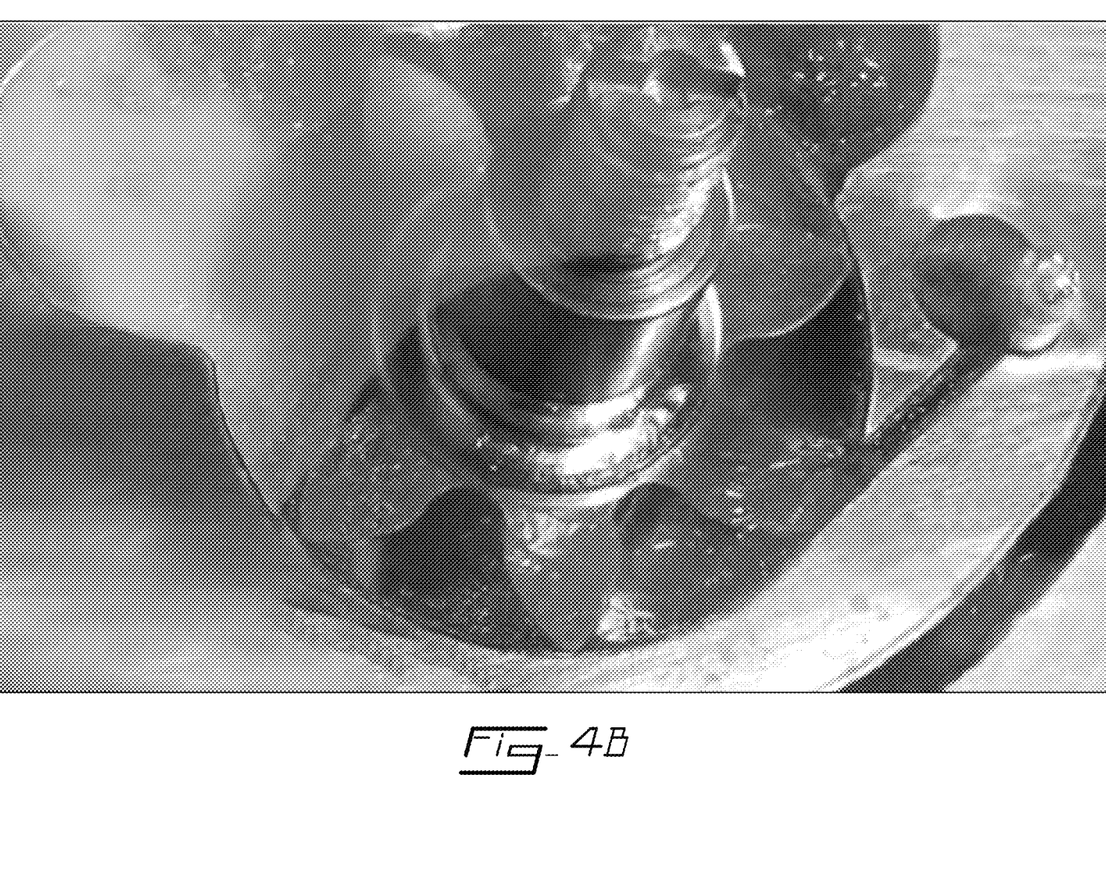

As presented above, typically, to favor a strong communication of momentum to drive a powerful vortex in the separator cavity 60, one may wish to achieve perfect parallelism between the axes 52, 64 of separator cavity 60 and the main cavity 44, perfect axial alignment, minimal distance, and perfect tangentiality of the fluid passage 62 relative to both the main cavity 44 and the separator cavity 60, within the limits of what is practical to achieve in practice. It will be noted that departing from these conditions in a relatively minor manner, may lead to negligible effects on the strength of the vortex, and there is thus some allowance in practice to deviate from perfect parallelism and perfect tangentiality. Moreover, it was noted that in one embodiment, creating a small radially outward angle as the fluid passage branches off from the curved surface 54, such as between 5 and 10 degrees from parallel to the curved surface at the point where it branches off and such as shown in the embodiment of FIGS. 4A and 4B for instance, could even lead to slightly better performance. Further experimentation may be required to achieve a fuller understanding of the underlying effects associated to such an improvement in performance.

In any event, it is believed that the general operation, as illustrated in FIGS. 4A and 4B, is as follows: the air-oil mixture enters the pump as a homogeneous two-phase fluid. The centrifugal force separates the oil which collects on the pump housing (curved surface). The advancing tooth (pushing member) sweeps the oil over the housing. The shear force applied by the housing onto the moving oil layer forces the oil to collect in front of the sweeping tooth. The oil lump is discharged as a brief pulse into the narrow channel (fluid passage). The narrow channel discharging into the auxiliary conduit, which acts here as a collector, induces and maintains a vortex in the collector. The vortex may act as a flywheel to smoothen the pressure pulsation originated by the discontinuous oil discharging thus improving the energy recovery and oil separation. The vortex separates the residual air into a bubble in the middle of the collector. The air is continuously released by a small relief hole. The oil follows a helical motion in the collector as it is transferred from the scavenge pumps to the main oil pump. The helical motion is slowed down in the conical portion according to the moment of momentum conservation law which slowing down leads to increased static pressure at the oil outlet, according to Bernouilli's law.

Figure 5:
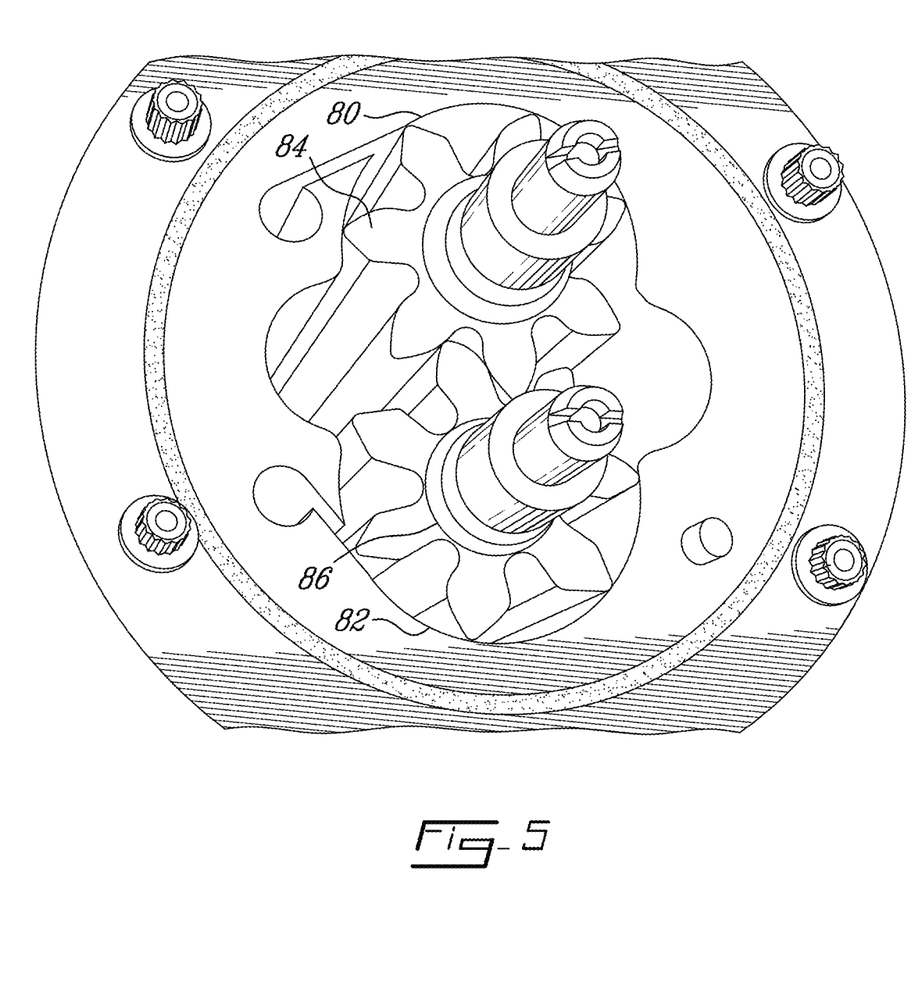
FIG. 5 is a front elevation view of another example of a scavenge pump.

FIG. 5 illustrates another embodiment. In this embodiment, the main cavity can be said to have a first cavity portion 80 housing a first rotor 84, and a second cavity portion 82 housing a second rotor 86, the first rotor and the second rotor having teeth and being meshed with each other for torque transmission therebetween, and forming a gear pump. A first fluid passage branches off and bleeds off a tangential fluid flow from the first cavity portion 80/first rotor, leading to a first separator cavity, and a second fluid passage branches off and bleeds off a tangential fluid flow from the second cavity portion 82/second rotor. Both fluid passages can be configured to preserve the momentum of fluid and drive a strong vortex in the corresponding separator cavity.

As shown in this embodiment, the vortex angular orientation can be the same angular orientation than the rotor angular orientation (e.g. upper rotor in the image), or the vortex angular orientation can be opposite to the angular orientation of the rotor (e.g. lower rotor in the image). It was found that these two different configurations could offer better performances in distinct conditions, and so in practice, it may be preferable to choose the optimal configuration for the specificities of the embodiment (i.e. same angular orientation or opposite angular orientation), and use both auxiliary cavities in the configuration considered optimal for the application (i.e. use a symmetrical design).

Figure 6:
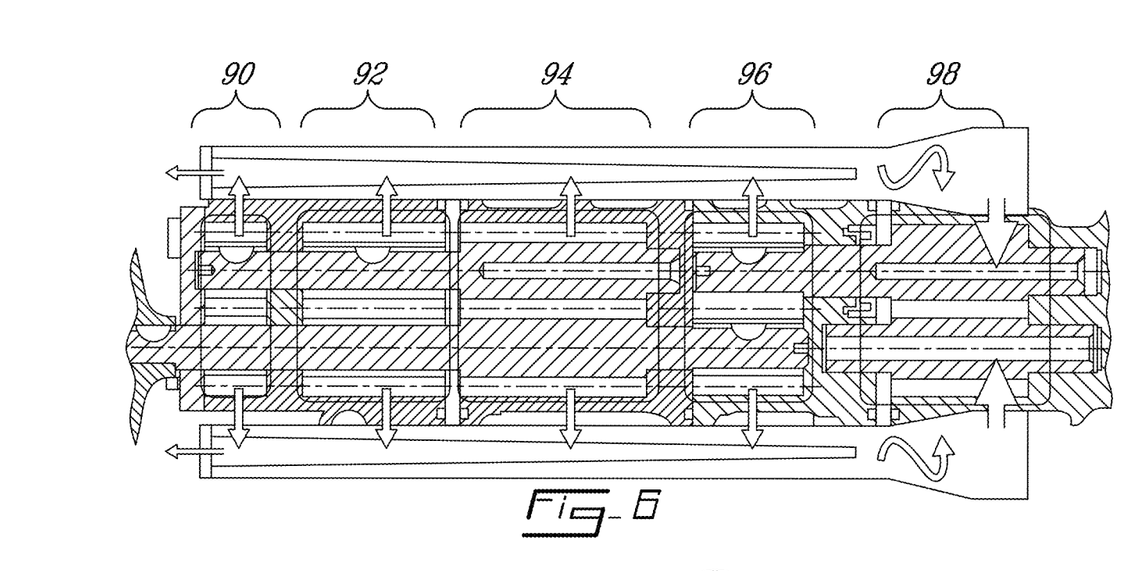
FIG. 6 is a cross-sectional view of the scavenge pump of FIG. 2, taken across a radially-extending plane.
Figure 7:
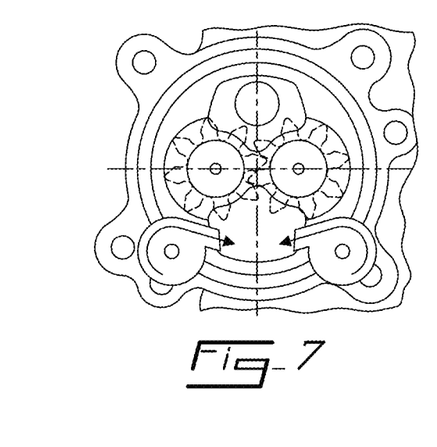
FIG. 7 is a transversal cross-sectional view taken from FIG. 5.

Turning now to FIG. 6, it can be seen that optionally, the pump can have more than one stage, and that the auxiliary cavities can axially span all the stages and collect vortex-driving momentum from all stages. In the embodiment illustrated the pump is a gear pump which has four scavenging stages 90, 92, 94, 96 which each have fluid passages between the main cavity and the corresponding separator cavity. Moreover, the pump has an additional stage 98 which operates as a main pump. As shown in FIG. 7, an oil outlet of each one of the auxiliary cavities is connected to the inlet of the main cavity of the main pump stage. The main pump can proceed to pump the separated oil to the oil delivery system 22.

The above description is meant to be exemplary only, and one skilled in the art will recognize that changes may be made to the embodiments described without departing from the scope of the invention disclosed. For example, the pump can be used in other contexts than that of a gas turbine engine. Still other modifications which fall within the scope of the present invention will be apparent to those skilled in the art, in light of a review of this disclosure, and such modifications are intended to fall within the appended claims.

The invention claimed is:

1. A scavenge pump of an oil scavenging system comprising a pump body, a main cavity having an inlet and an outlet, a rotor rotatably mounted in the main cavity and configured to pump fluid from the inlet to the outlet as it rotates, a separator cavity disposed adjacent the main cavity and configured to sustain a vortex, a fluid passage fluidly connecting the main cavity to the separator cavity, the fluid passage being configured for preserving momentum of fluid from the main cavity to the separator cavity to contribute to the vortex in the separator cavity.

2. The scavenge pump of claim 1 wherein the main cavity has a first cavity portion housing the rotor, and a second cavity portion housing a second rotor, the first rotor and the second rotor having teeth and being meshed with each other for torque transmission therebetween, and forming a gear pump, further comprising a second separator cavity, and a second fluid passage fluidly connecting the second cavity portion to the second separator cavity the second fluid passage preserving momentum of fluid from the second cavity portion to the second separator cavity to contribute to a second vortex in the second separator cavity.

3. The scavenge pump of claim 1 wherein the main cavity and rotor form a first stage, further having at least a second stage concentric to and axially offset from the first stage.

4. The scavenge pump of claim 3 wherein the separator cavity fluidly is connected to both the first stage and the second stage, the momentum of fluid from both stages driving the vortex.

5. The scavenge pump of claim 3 wherein the separator cavity has a radially broadened portion adjacent the second stage, an oil outlet in the radially broadened portion leading to the second stage, and an air outlet axially opposite the oil outlet.

6. The scavenge pump of claim 1 wherein the main cavity has a curved surface between the inlet and the outlet, the rotor has a pushing member configured to follow the curved surface as it rotates, the fluid passage branching tangentially from the curved surface, between the inlet and the outlet.

7. The scavenge pump of claim 6 wherein the separator cavity has a solid of revolution shape, the fluid passage connecting tangentially to the separator cavity.

8. The scavenge pump of claim 7 wherein the fluid passage has a width of less than half of the radius of the separator cavity.

9. The scavenge pump of claim 8 wherein the fluid passage has the width of less than a quarter of the radius of the separator cavity.

10. The scavenge pump of claim 6 wherein the curved surface extends at least 50° between the inlet and the fluid passage.

11. The scavenge pump of claim 10 wherein the curved surface extends at least 70° between the inlet and the fluid passage.

12. The scavenge pump of claim 6 wherein the rotor has a plurality of pushing members being circumferentially interspaced from one another by a pitch angle, wherein the curved surface extends at least by the value of the pitch angle between the fluid passage and the outlet.

13. The scavenge pump of claim 6 wherein a portion of the fluid passage connecting the main cavity is oriented at between 5° and 10°, radially outwardly, from parallel to the portion of the curved surface where it branches off.

14. The scavenge pump of claim 1 wherein the separator cavity has two axial ends, a gas outlet at a first one of the axial ends, and a liquid outlet at the other one of the axial ends.

15. The scavenge pump of claim 1 wherein the separator cavity is parallel to the main cavity, and axially aligned with the main cavity.

16. The scavenge pump of claim 15 wherein both the separator cavity and the main cavity are in the pump body.

17. The scavenge pump of claim 1 wherein the vortex is in the same angular orientation as the rotor rotation orientation.

18. The scavenge pump of claim 1 wherein the vortex is in the opposite angular orientation than the rotor rotation orientation.

19. The scavenge pump of claim 1 wherein a fluid connection is straight between the separator cavity and the main cavity.

20. A gas turbine engine comprising a compressor, a combustor, and a turbine in fluid flow communication, bearings via which rotating components are rotatably held in non-rotating components, an oil lubrication system for delivering oil to the bearings, and an oil scavenge system for collecting oil from the bearings, the oil scavenge system having at least one scavenge pump having a pump body, a main cavity having an inlet and an outlet, a rotor rotatably mounted in the main cavity and configured to pump fluid from the inlet to the outlet as it rotates, a separator cavity disposed adjacent the main cavity, a fluid passage fluidly connecting the main cavity to the separator cavity, the fluid passage preserving momentum of fluid from the main cavity to the separator cavity to contribute to a vortex in the separator cavity.

* * * * *